US009336703B2

(12) United States Patent
Kim

(10) Patent No.: US 9,336,703 B2

(45) Date of Patent: May 10, 2016

(54) PIXEL ARRAY STRUCTURE AND DISPLAY APPARATUS INCLUDING THE SAME

(71) Applicant: Samsung Display Co., Ltd., Yongin, Gyeonggi-Do (KR)

(72) Inventor: Gun-Sik Kim, Yongin (KR)

(73) Assignee: Samsung Display Co., Ltd. (KR)

( * ) Notice: Subject to any disclaimer, the term of this patent is extended or adjusted under 35 U.S.C. 154(b) by 165 days.

(21) Appl. No.: 14/167,297

(22) Filed: Jan. 29, 2014

(65) Prior Publication Data

US 2015/0029208 A1 Jan. 29, 2015

(30) Foreign Application Priority Data

Jul. 25, 2013 (KR) ........................ 10-2013-0088177

(51) Int. Cl.

| | |
|---|---|
| ***G06T 11/00*** | (2006.01) |
| ***G06T 7/00*** | (2006.01) |
| ***G06T 7/40*** | (2006.01) |
| ***G06T 5/00*** | (2006.01) |
| ***G09G 5/02*** | (2006.01) |
| ***G09G 3/20*** | (2006.01) |
| ***G09G 5/06*** | (2006.01) |
| ***H04N 1/60*** | (2006.01) |
| ***H04N 5/202*** | (2006.01) |
| *G09G 3/32* | (2016.01) |

(52) U.S. Cl.

CPC ............ *G09G 3/2003* (2013.01); *G09G 3/2074* (2013.01); *G09G 3/2092* (2013.01); *G09G 3/3225* (2013.01); *G09G 2300/0452* (2013.01)

(58) Field of Classification Search

CPC combination set(s) only.

See application file for complete search history.

(56) References Cited

U.S. PATENT DOCUMENTS

| | | | | |
|---|---|---|---|---|
| 2002/0036740 | A1 | 3/2002 | Kubo et al. | |
| 2004/0051724 | A1* | 3/2004 | Elliott | G02F 1/133514 345/694 |
| 2004/0239837 | A1 | 12/2004 | Hong et al. | |
| 2006/0158466 | A1 | 7/2006 | Chien et al. | |
| 2007/0064020 | A1* | 3/2007 | Credelle | G09G 3/2003 345/694 |
| 2010/0109562 | A1 | 5/2010 | Shen et al. | |
| 2012/0092238 | A1 | 4/2012 | Hwang et al. | |
| 2012/0287143 | A1* | 11/2012 | Brown Elliott | G09G 5/02 345/589 |
| 2012/0287146 | A1* | 11/2012 | Brown Elliott | G09G 5/02 345/590 |
| 2012/0287147 | A1* | 11/2012 | Brown Elliott | G09G 5/02 345/593 |

(Continued)

FOREIGN PATENT DOCUMENTS

| | | |
|---|---|---|
| KR | 2003-0042603 | 6/2003 |
| KR | 1020060039706 A | 5/2006 |

(Continued)

OTHER PUBLICATIONS

EESR 14161628.4-1904 dated Oct. 1, 2014.

*Primary Examiner* — Wesner Sajous

(74) *Attorney, Agent, or Firm* — Innovation Counsel LLP

(57) ABSTRACT

A pixel array structure for populating the display area of a display device includes a repeated first pixel group that consists of one or more first colored subpixels, three or more second colored subpixels and two or more third colored subpixels. The respective numbers of the first colored subpixels, the second colored subpixels, and the third colored subpixels that are provided within the first pixel group are in a respective ratio of 1:3:2. In one embodiment, an input RGB image is remapped to have luminance values corresponding to Cyan-Magenta-Yellow coordinates and the latter are used in combination with subpixel rendering (SPR) to drive the colored subpixels of the pixel array structure.

20 Claims, 10 Drawing Sheets

(56) References Cited

U.S. PATENT DOCUMENTS

2012/0287148 A1* 11/2012 Brown Elliott .......... G09G 5/02 345/593
2012/0287168 A1* 11/2012 Botzas ................. G09G 3/3413 345/690
2013/0113997 A1 5/2013 Lee et al.
2013/0215360 A1* 8/2013 Pollack ................ G09G 3/3413 349/61
2014/0264355 A1* 9/2014 Yamashita .......... H01L 27/1255 257/71

FOREIGN PATENT DOCUMENTS

KR 10-2010-0051019 5/2010
KR 10-2012-0039453 4/2012

* cited by examiner

PIXEL ARRAY STRUCTURE AND DISPLAY APPARATUS INCLUDING THE SAME

RELATED APPLICATIONS

This application claims the benefit of Korean Patent Application No. 10-2013-0088177, filed on Jul. 25, 2013, in the Korean Intellectual Property Office, the disclosure of which application is incorporated herein in its entirety by reference.

BACKGROUND

1. Field of Disclosure

The present disclosure of invention relates to pixel array structures and display apparatuses including the same, and more particularly, to pixel array structures that provide for user perception of high image resolution while at the same time allowing for increased mass production yield and longer device lifespan.

2. Description of Related Technology

With the recent rapid development of semiconductor technologies, the typical screen size of flat panel display apparatuses has tended to increase while a desire remains that weight of the apparatus should decrease. Also, demand for flat panel display apparatuses with such superior properties has explosively increased.

Examples of such flat or otherwise thin panel display apparatuses include liquid crystal displays (LCDs), plasma display devices (PDPs), field emission display devices (FEDs), electroluminescence display devices (ELDs), electrophoresis display devices (EPDs), and an organic light-emitting display apparatuses.

In such display apparatuses, a plurality of unit pixels is formed by use of primary colored subpixels such as red subpixels, green subpixels, and blue subpixels. A variety of color images may be displayed through use of the cell like or unit pixels having the repeated pattern of primary colored subpixels. More specifically, the red subpixels, green subpixels, and the blue subpixels of the repeat cell may be arranged in wide variety of ways. The conventional approach had been to rely on striped vertical patterns wherein the red subpixels, green subpixels, and blue subpixels are each respectively arranged in a stripe form, that is, so that a plurality of subpixels of a same color are arranged as vertical columns to thereby yield respective red-only columns, green-only columns and blue-only columns.

In addition to including the light emitting subpixels, it is desirable to separate the subpixels from one another with a black matrix or alike blocking layer. However, in the display apparatuses that have the vertical stripe-type pixel array structures, one of the techniques used to increase a resolution thereof is to provide more blocking layers between the subpixels. Unfortunately, this results in a decrease of a light emission aperture ratio of the device. Since a minimum interval for forming an opening of a subpixel is predefined, it is difficult to manufacture a high-resolution organic light-emitting display (OLEO) apparatus having a stripe-type pixel array structure.

In this regard, a variety of so-called, pentile matrix structures have been proposed, in which a red subpixel and a blue subpixel are alternately formed in a same first column and two green subpixels are formed in an adjacent column. In such a pentile matrix structure, the number of independently driven green subpixels is double that of the red subpixels and the blue subpixels and the total number of subpixels per repeat group (unit cell) is four. In other words, the density of the red subpixels and of the blue subpixels is reduced by about ½ as compared with the older stripe-type pixel array structure wherein for each green subpixel there is one blue subpixel and one red subpixel. Hence, the total number of subpixels needed for producing a color image is reduced by about ⅔ths (due to having deleted 1 blue subpixel and 1 red subpixel for every pair of conventional RGB pixels) as compared with the stripe-type pixel array structure. As a result, this form of pentile matrix structure may ensure a high aperture ratio and achieve a substantially same cognitive (user-perceived) resolution as the stripe-type pixel array structure by using a so-called, subpixel rendering (SPR) driving method. (The described "pentile" matrix structure is one of alternate and so-named matrices. In another pentile matrix, there are 5 subpixels per repeat group, namely, one central blue subpixel and a checkerboard pattern formed around it by 2 red subpixels and 2 green subpixels.)

With regard to the above-described 2G/1B/1R pentile matrix structure, it is difficult to use it for implementing a high resolution greater than 440 subpixels per inch (ppi), and the reduction in the number of subpixels per repeat group may degrade an image quality during actual image reproduction.

It is to be understood that this background of the technology section is intended to provide useful background for understanding the here disclosed technology and as such, the technology background section may include ideas, concepts or recognitions that were not part of what was known or appreciated by those skilled in the pertinent art prior to corresponding invention dates of subject matter disclosed herein.

SUMMARY

The present disclosure of invention provides a pixel array structure for populating the display area of a display device such as and organic light emitting diodes one and provides various display apparatuses employing the same. The disclosed pixel array structures have a fewer number of certain ones of differently colored subpixels within corresponding minimal repeat groups of the display area and are thus capable of increasing the lifespan, mass production yield, and/or perceived resolution of the display apparatuses, without degradation of the perceived image quality.

Additional aspects will be set forth in part in the description which follows and, in part, will be apparent from the description, or may be learned by practice of the presented embodiments.

According to one aspect of the present disclosure, a pixel array structure includes: one or more first pixel groups each including: a first colored subpixel and a second colored subpixel disposed along a first column of the first pixel group; another second colored subpixel and a third colored subpixel disposed along a second column adjacent to the first column; and another third colored subpixel and yet another second colored subpixel disposed along a third column adjacent to the second column, wherein the respective numbers within the first pixel group of the first colored subpixels, the second colored subpixels, and the third colored subpixels are in a respective ratio of 1:3:2.

The first colored subpixel disposed in the first column may be disposed in a same row as the second colored subpixel disposed in the second column and a third colored subpixel disposed in the third column.

The second colored subpixel disposed in the first column may be disposed in a same row as the third colored subpixel disposed in the second column and the second colored subpixel disposed in the third column.

The first colored subpixel, the second colored subpixel, and the third colored subpixel are of different colors.

The first colored subpixel may be a blue pixel.

The second colored subpixel may be a green pixel, and the third colored subpixel may be a red pixel.

At least one of the second colored subpixels constituting the first pixel group may have a different area than that of the others.

An area of one of the second colored subpixels may be smaller than an area of at least one of the first colored subpixel or the third colored subpixel.

The first pixel groups may be disposed side by side along a plurality of rows and columns.

A second pixel group that is flipped vertically (or horizontally) with respect to the first pixel group may be alternately disposed along a same row as the first pixel group.

Subpixel rendering (SPR) may be used to drive the first colored subpixels, the second colored subpixels, and the third colored subpixels.

The first colored subpixels, the second colored subpixels, and the third colored subpixels may have a rounded rectangular shape.

At least one of the first colored subpixels, the second colored subpixels, and the third colored subpixels may have a circular, oval, or polygonal shape.

According to one or more embodiments, a display apparatus is provided that includes: a substrate; and a plurality of display element forming a plurality of pixels or subpixels disposed on the substrate in accordance with a pixel array structure where the latter includes one or more first pixel groups, each of the first pixel group including: a first colored subpixel and a second colored subpixel disposed along a first column of the first pixel group; another second colored subpixel and a third colored subpixel disposed along a second column adjacent to the first column; and another third colored subpixel and yet another second colored subpixel disposed along a third column adjacent to the second column, wherein respective numbers of the first colored subpixels, the second colored subpixels, and the third colored subpixels as included within the first pixel group are respectively in a ratio of 1:3:2.

The first colored subpixel may be a blue pixel.

The first pixel groups may be disposed side by side along a plurality of rows and columns.

A second pixel group that is flipped vertically (or horizontally) with respect to the first pixel group may be alternately disposed along a same row as the first pixel group.

At least one of the first colored subpixel, the second colored subpixel, and the third colored subpixel may have a circular, oval, or polygonal shape.

The display apparatus may further include an encapsulating film that seals the plurality of display devices.

The display device may be an organic light-emitting device including a first electrode, a second electrode, and an organic emission layer disposed therebetween.

BRIEF DESCRIPTION OF THE DRAWINGS

These and/or other aspects of the present teachings will become apparent and more readily appreciated from the following description of exemplary embodiments, taken in conjunction with the accompanying drawings of which.

DETAILED DESCRIPTION

Figure 1:
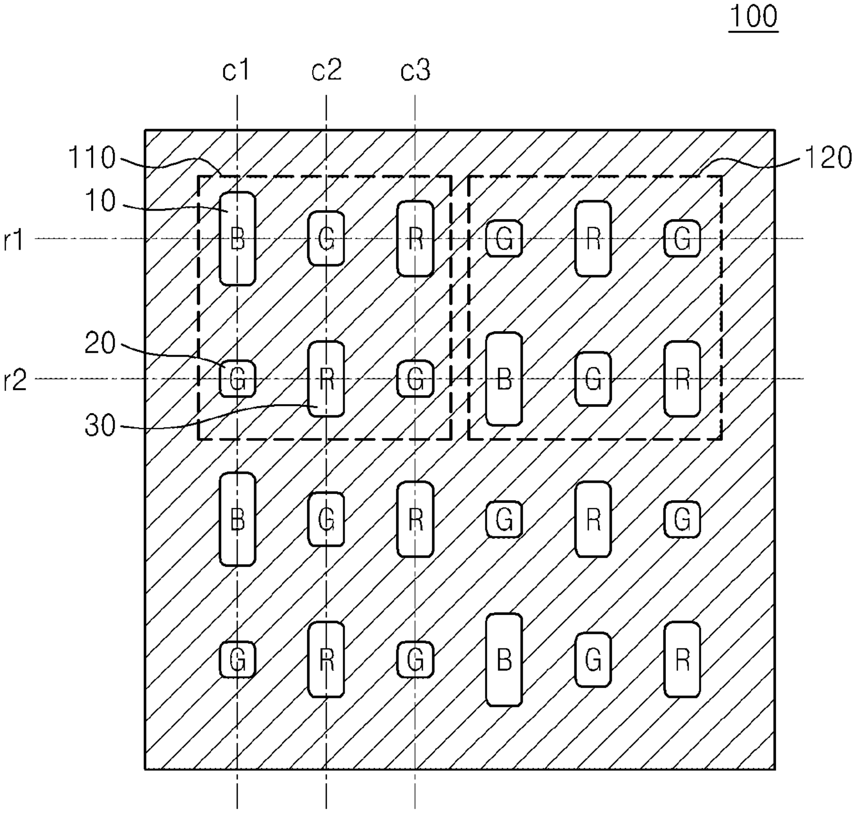
FIG. 1 is a plan view of a first pixel array structure according to a corresponding first embodiment of the present disclosure of invention.

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present teachings. As used herein, the term "and/or" includes any and all combinations of one or more of the associated listed items. Expressions such as "at least one of," when preceding a list of elements, modify the entire list of elements and do not modify the individual elements of the list.

The embodiments set forth herein are merely exemplary, and various modifications may be made therefrom without departing from the spirit and scope of the present teachings. For example, it will be understood that when a layer, region, or component is referred to as being "formed on," another layer, region, or component, it can be directly or indirectly formed on the other layer, region, or component. That is, for example, intervening layers, regions, or components may be present.

The terms used in the present specification are merely used to describe particular embodiments, and are not intended to limit the present invention. As used herein, the singular forms "a," "an", and "the" are intended to include the plural forms as well, unless the context clearly indicates otherwise. It will be further understood that the terms "comprises" and/or "comprising" used herein specify the presence of stated features or components, but do not preclude the presence or addition of one or more other features or components. It will be understood that although the terms "first", "second", etc. may be used herein to describe various components, these components should not be limited by these terms. These components are only used to distinguish one component from another.

FIG. 1 is a plan view of a first 3G/2R/1B pixel array structure 100 configured according to the present disclosure of invention.

Referring to FIG. 1, the pixel array structure 100 includes a first 3G/2R/1B pixel group 110 oriented in a first way and consisting of a respective first colored subpixel 10 (B) and a second colored subpixel 20 (G1) disposed along a first column c1, and further consisting of a second green subpixel (G2) and a third colored subpixel 30 (R1) disposed along a second column c2 adjacent to the first column c1. The illustrated first 3G/2R/1B pixel group 110 further consists of a second red subpixel (R2) and a third green subpixel (G3) disposed along a third column c3 adjacent to the second column c2. Thus, there are 6 subpixels in the first 3G/2R/1B pixel group 110, namely, the three green subpixels G1, G2, G3 plus the two red subpixels R1, R2 and the one blue subpixel (B).

Stated otherwise, the first colored pixel 10 (e.g., B), the second differently colored pixels 20 (e.g., G), and the third differently colored pixels 30 (e.g., R) provided in the first pixel group 110 are in a respective ratio of 1:3:2.

It may be noted that a BGR subgroup is formed by having the first pixel 10 (B) of the first column c1 disposed in the same row (r1) as the second pixel 20 (G2) of the second column c2 and the third pixel 30 (R2) of the third column c3. Thus with use of appropriate subpixel rendering (SPR), a substantially white spot may be generated by turning on the lights of the first 3 subpixels of the first row r1.

With regard to the here mentioned, appropriate subpixel rendering (SPR), it is to be understood that further with respect to the various display devices mentioned here as employing the mG/nR/kB repeat group (where whole numbers m, n, k satisfy m>n>1 and preferably the sum m+n+k equals a product of C*R where C is plural number of columns and R is a plural number of rows making up the corresponding minimal sized one or more repeat groups), that such display devices are understood to include appropriate additional hardware means for driving the pixels or subpixels of the display area (DA) such as but not limited to, corresponding data line drivers, corresponding gate or scan line drivers, a corresponding timing controller and within the latter or elsewhere, appropriate data processing and memory resources including resources for carrying out the said appropriate subpixel rendering (SPR) process(es). Moreover, the appropriate data processing and memory resources may include resources for carrying out input and output side gamma conversions which may be understood as respective data decompression and recompression operations) and other digital image processing operations as may be deemed appropriate for the respective display device and/or its environment.

Referring to the second row r2 of the first 3G/2R/1B pixel group 110, it may be noted that the second colored pixel 20 (G1) thereof disposed in its first column c1 is disposed along the same row (r2) as the third colored pixel 30 (R1) disposed in the second column c2 thereof and the second colored pixel 20 (G3) disposed in the third column c3 thereof. Thus with use of appropriate subpixel rendering (SPR), a substantially yellow spot may be generated by turning on the lights of the first 3 subpixels of the second row r2 of the first 3G/2R/1B pixel group 110.

In one embodiment that is not shown, the entire pixel array structure 100 may be tessellated by a repeat of just the first pixel groups 110. In other embodiments, the pixel array structure 100 may include a plurality of the first pixel groups 110 disposed along respective but spaced apart single columns. Alternatively, in yet other embodiments, the pixel array structure 100 may include a plurality of the first pixel groups 110 disposed along respective but spaced apart single rows. In yet other embodiments, the pixel array structure 100 may include a plurality of the first pixel groups 110 disposed side by side along a plurality of rows and columns.

Stated otherwise and more generally, in accordance with the present disclosure there is provided a display device having a display area tessellated by a repeat group (e.g., 110) of minimal size among repeat groups that can be deemed to be populating the display area in a tessellating manner, where the minimal repeat group comprises: (a) a first number of one or more first colored subpixels (10) whose respective first color (e.g., Blue) predominantly occupies a relatively short wavelength portion of the visible light spectrum (e.g., from about 380 nm to about 780 nm); (b) a second number of three or more second colored subpixels (20) whose respective second color (e.g., Green) predominantly occupies a relatively intermediate wavelength portion of the visible light spectrum; and (c) a third number of two or more third colored subpixels (30) whose respective third color (e.g., Red) predominantly occupies a relatively long wavelength portion of the visible light spectrum; wherein the third number is greater than the first number and less than the second number; and wherein the relatively intermediate wavelength portion is interposed on the visible light spectrum between the relatively short wavelength portion and the relatively long wavelength portion.

More specifically, in the embodiment illustrated in FIG. 1, the pixel array structure 100 includes a second 3G/2R/1B pixel group 120 having an orientation different from that of the first 3G/2R/1B pixel group 110. More specifically, the second pixel group 120 has a pixel array structure that is a vertical flip of the structure of the first pixel group 110. In other words, the second pixel group 120 also includes three green subpixels G1, G2, G3 plus two red subpixels R1, R2 and one blue subpixel (B) except that the blue subpixel (B) is disposed in the second row (r2) rather than in the first and the first row (r1) of the second 3G/2R/1B pixel group 120 contains green subpixels G1 and G3.

In some embodiments, the pixel array structure 100 may include the first pixel group 110 and the second pixel group 120 alternately disposed along a row. In other embodiments, the pixel array structure 100 may include the first pixel group 110 and the second pixel group 120 alternately disposed along a column thereof. In yet other embodiments, the pixel array structure 100 may include the first pixel group 110 and the second pixel group 120 alternately disposed along both columns and rows thereof in accordance with a checkerboard pattern.

Each respective one of the first colored pixels 10, the second colored pixels 20, and the third colored pixels 30 may have different areas and/or shapes. In addition, one or more of the plurality of the second colored pixels 20 constituting the first pixel group 110 or the second pixel group 120 may have different areas and/or shapes. Likewise, one or more of the plurality of third colored pixels 30 constituting the first pixel group 110 or the second pixel group 120 may have different areas and/or shapes. In some embodiments, the area of each of the second colored pixels 20 (e.g., Green) may be smaller than the respective areas of the first colored pixels 10 (e.g., Blue) and/or of the third colored pixels 30 (e.g., Red). In the illustrated embodiment, the second colored subpixel of row r1, column c2 is larger in area than each of the other second colored subpixels of row r2, columns c1 and c3.

The respective areas of the first colored pixels 10, the second colored pixels 20, and the third colored pixels 30 may be determined according to threshold values of various processes for forming their respective light emitting elements, and are not limited to the relative organization of big versus small and square versus oblong as shown in the present drawings. For example, the areas of the first colored pixels 10, the second colored pixels 20, and the third colored pixels 30 may be larger with respect to the corresponding areas of the first pixel group 110 or the second pixel group 120 in which they are disposed as illustrated in the present drawings.

At least one of the first colored pixels 10, the second colored pixels 20, and the third colored pixels 30 may alternatively have a circular, or an oval or an otherwise polygonal but different shape. In some embodiments, the first colored pixels 10, the second colored pixels 20, and/or the third colored pixels 30 may respectively have rounded-corner rectangular shapes.

The first colored pixels 10, the second colored pixels 20, and the third colored pixels 30 may respectively emit respective lights of different colors or wavelengths. while keeping the 3G/2R/1B relative ratio between them, the actual numbers of independently driven first colored pixels 10, second colored pixels 20, and third colored pixels 30 included in the first pixel group 110 may be increased according to desired and increased cognitive resolutions by users of the display device.

Generally, the cognitive resolution is a resolution recognized by the human visual system (e.g., eyes and brain), and this may vary according to color differences between the utilized subpixel elements 10, 20 and 30 and according to personal variations. In other words, even though the same resolution is implemented with different colors, a first observer's cognitive resolution may be different from that of another observer.

The first colored pixel 10 may represent a color (e.g., Blue or another color having a relatively small wavelength) having a relatively low cognitive perception attribute in terms of perceived luminance spots and/or perceived color differentiation resolution whereas the respective colors of the second colored pixels 20 (e.g., Green or another color having a relatively intermediate wavelength as compared to those of the first and third colors) and the third colored pixels 30 (e.g., Red or another color having a relatively large wavelength). Thus, because the first colored pixels 10 may have less influence on (less importance to) the users cognitive resolution of such subpixels as compared to that of the otherwise colored subpixels 20 and 30, the per area density of the first colored subpixels 10 may be the smallest. The second colored pixels 20 may represent a color (e.g., Green) having a highest perception attribute in terms of perceived luminance spots and/or perceived color differentiation resolution as compared to those of the respective first (e.g., B) and third (e.g., R) colors of the first pixels 10 and the third pixels 30. Therefore, even though the numbers of the first pixels 10, the second pixels 20, and the third pixels 30 included in the first pixel group 110 are different from each other, the image quality of a display apparatus including the pixel array structure 100 may be perceived by the human visual system as being a good one because of the perceptual limits of the human visual system. In some embodiments, the first colored pixels 10 may be blue subpixels. In some embodiments, the second colored pixels 20 may be green subpixels, and the third colored pixels 30 may be red subpixels.

Compared with the vertical RGB stripe-type pixel array structure, the total number of subpixels in the pixel array structure 100 may be reduced and yet a perceived high resolution may be realized for a display apparatus whose display area is tessellated by the pixel array structure 100 and which uses an appropriate subpixel rendering (SPR) driving method. In this regard, the following description will be given with reference to FIGS. 2 and 3A to 3D.

Figure 2:
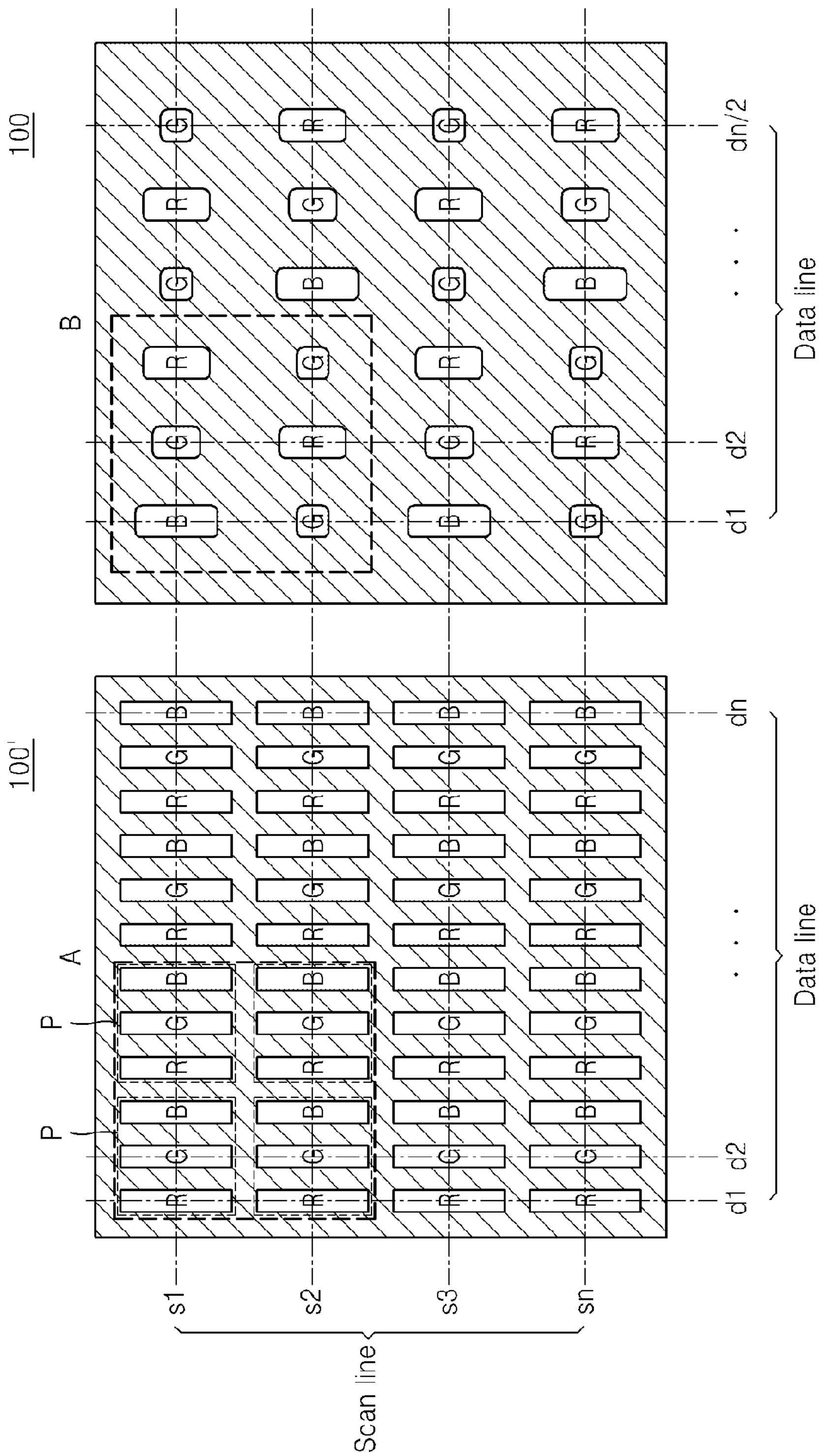
FIG. 2 is a plan view showing for sake of side-by-side comparison, a conventional vertical stripe-type pixel array structure and a replacement therefor 3G/2R/1B pixel array structure according to an embodiment of the present disclosure.

FIG. 2 is a plan view for comparing a stripe-type pixel array structure 100' (left side) and the pixel array structure 100 (right side) according to the first embodiment of the present disclosure. The left side structure 100' is not intended to represent merely a corresponding vertical-striped RGB display device. It is also intended to represent an input image data organization that is to be mapped onto the right side 3G/2R/1B populated structure 100.

In FIG. 2, the designation "A" is also used to represent the stripe-type pixel array structure 100' (on the left side) while "B" represents the pixel array structure 100 (right side) according to the first embodiment. As illustrated in FIG. 2, the stripe-type pixel array structure 100' ("A") is a structure in which red, green and blue sub-pixels R, G, and B are sequentially disposed along rows. In the stripe-type pixel array structure 100', a single red sub-pixel R, a single green sub-pixel G, and a single blue sub-pixel B constitute a corresponding single pixel P.

In FIG. 2, the right side dashed block within "B" corresponds to the four RGB pixels P bounded in dashed block "P" within the stripe-type pixel array structure "A" or 100'. In other words, the 4R/4G/4B subpixel data items of the left side dashed block "P" are to be mapped to the 3G/2R/1B display structure of the dashed block within "B" by means of an appropriate and automated subpixel rendering (SPR) process.

Therefore, the number of the first colored pixels 10 (B) to be used is reduced to ¼-th as compared with the data originating stripe-type pixel array structure 100'. In addition, as compared with the stripe-type pixel array structure 100', the number of the second pixels 20 is reduced by ½, and the number of the third colored pixels 30 is reduced to ¾-ths of the original (4G is being reduced to 3G). As such, the total number of the pixels of the pixel array structure 100 is smaller than that of the stripe-type pixel array structure 100', thereby leading to an improvement in the resources utilization aspect as compared to that of the left side RGB vertical striped pixel array structure 100' ("A").

For sake of independent drive of each, the first colored pixels 10 (of structure "B"), the second colored pixels 20, and the third colored pixels 30 may each be connected to a respective plurality of signal lines (e.g., a respective data line and a respective gate or scan line). More specifically, the signal lines may include scan lines s1 to sn for transferring gate signals, data lines d1 to do for transferring data signals, and a plurality of driving voltage supplying lines (not illustrated) for transferring driving voltages. The scan lines s1 to sn extend in a substantially row direction and are substantially parallel to one another, and the data lines d1 to dn extend in a substantially column direction and are substantially parallel to one another.

In the here discussed first embodiment, the number of the scan lines s1 to sn of the pixel array structure 100 (on the right) is equal to that of the stripe-type pixel array structure 100' (on the left), and the number of the data lines d1 to dn of the pixel array structure 100 (on the right) is half of that of the stripe-type pixel array structure 100' (on the left). Due to the reduction in the number of the data lines d1 to dn, substantially similar images may be displayed by the pixel array structure 100 ("B" on the right) while consuming less power consumption.

So to recap here, a plurality of 4 RGB pixels of the input data set ("A" on the left) may be mapped by means of subpixel rendering (SPR) for display by the first pixel group 110 (on the right) wherein the color plane by color plane transformation may be represented as "A"→"B" and more specifically, as 4Blue$_{\text{"A"}}$→1Blue$_{\text{"B"}}$, 2Red$_{\text{"A"}}$→2Red$_{\text{"B"}}$ and 4Green$_{\text{"A"}}$→3Green$_{\text{"B"}}$ in terms of utilized subpixels.

Regarding the subpixel rendering (SPR) driving method, when a particular pixel is driven so as to display an image having a particular shape, a desired effect is obtained by driving not only the particular pixel but also pixels adjacent to the particular pixel, and thus, a specific image is naturally displayed. One automated (machine-implemented) rendering driving method of the pixel array structure 100 according to the embodiment of the present invention will be described below with reference to FIGS. 3A to 3D.

FIGS. 3A to 3D illustrate examples of methods for implementing logic pixels of the pixel array structure 100 according to a machine-implemented automated embodiment of the present disclosure of invention.

Figure 3A:
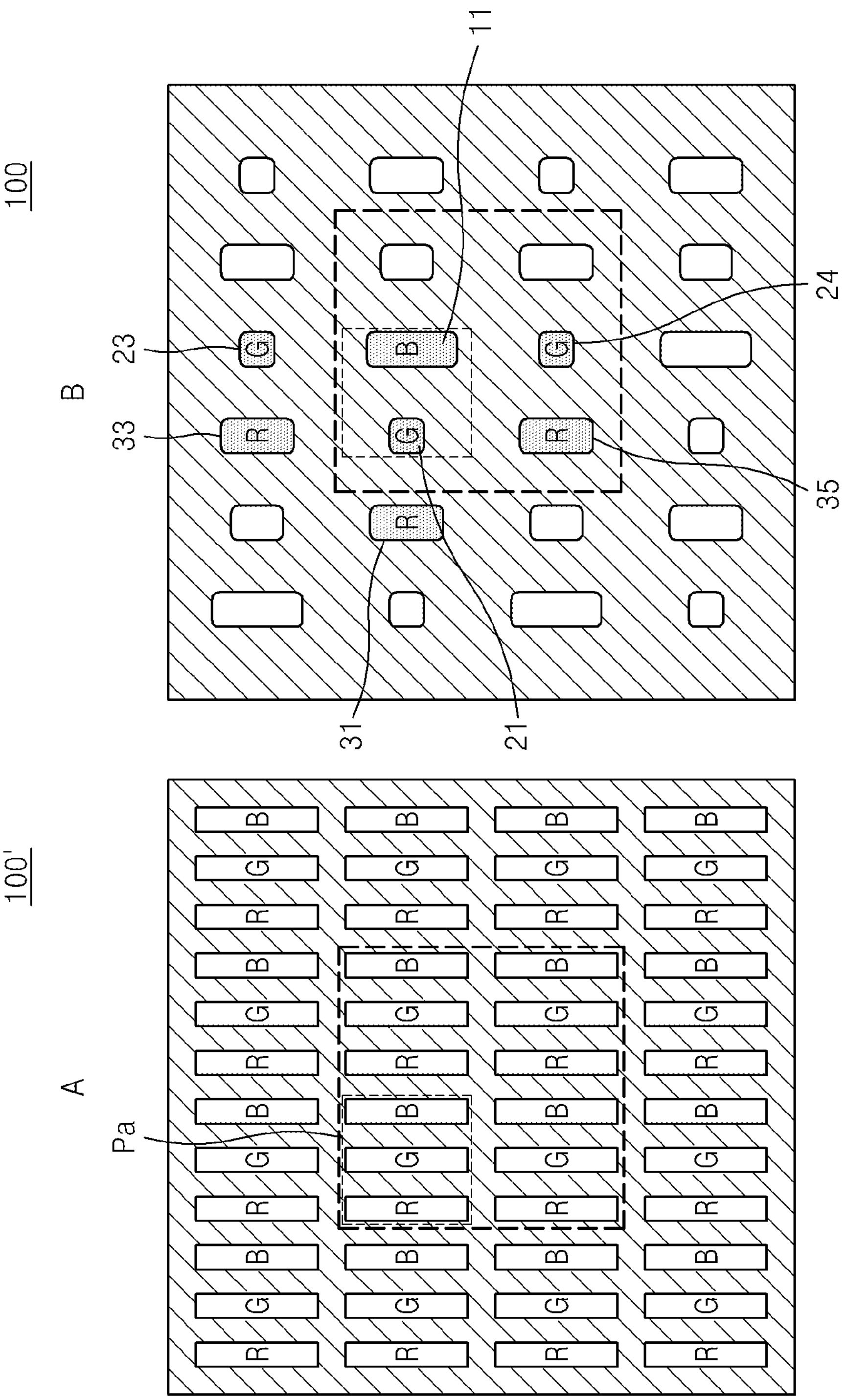
FIGS. 3A to 3D illustrate examples of methods for implementing logic pixels of the pixel array structure according to the first embodiment.

FIG. 3A illustrates an example of a method for implementing a pixel of the pixel array structure 100, which corresponds to a 4R/4G/4B-pixel Pa of the stripe-type pixel array structure 100'. When a first colored subpixel 11 (on the right) is a blue subpixel that is driven to have a luminance of 100%, a Cyan color may be emulated by driving the surrounding subpixels so that a second colored subpixel 21 adjacent on the left of the first pixel 11 has a luminance of 80% and second colored subpixels 23 and 24 vertically adjacent to the first pixel 11 have a luminance of 10%. Thus the mixing of the 100% Blue with the 80%+10%+10% of Green in the here described, skewed manner provides an equivalent for a Cyan spot disposed substantially in the area of the 4R/4G/4B-pixel Pa (on the left).

In addition, a Magenta spot disposed substantially in the area of the 4R/4G/4B-pixel Pa (on the left) pixel may be emulated by again turning on the first colored subpixel 11 (on the right) to 100% while adjusting the luminances of third colored subpixels 31, 33, and 35 to 40%, 30% and 30%, respectively (where 40%+30%+30%=100%). Moreover, an appropriately positioned Yellow spot may be emulated by leaving the first colored subpixel 11 (on the right) off while lighting up a desired pair of second and third colored subpixels (where Red plus Green creates a perception of Yellow). Hence a transformation from an RGB triad of primary colors to a Cyan/Magenta/Yellow triad of secondary colors is made possible by the use of the 3G/2R/1B pixel array structure 100 shown on the right.

Figure 3B:
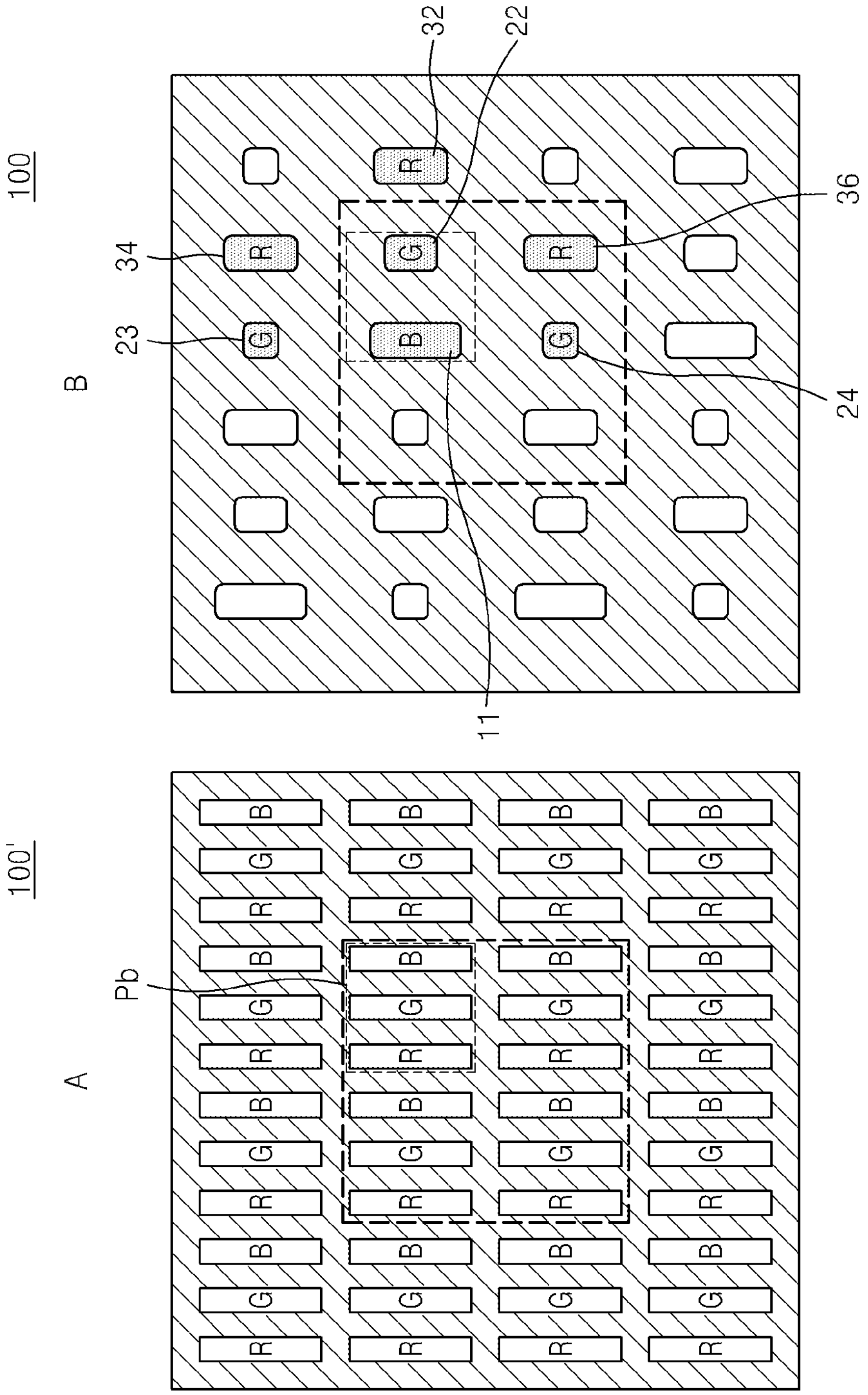

FIG. 3B illustrates an example of a method for implementing a logic pixel of the pixel array structure 100, which corresponds to b-pixel Pb of the stripe-type pixel array structure 100' when shifted more to the right. When a first colored subpixel 11 is a blue pixel having a luminance of 100%, a Cyan color may be emulated by driving pixels so that a second colored pixel 22 adjacent on the right of the first subpixel 11 has a luminance of 80% and second colored pixels 23 and 24 vertically adjacent to the first subpixel 11 each have a luminance of 10%. In addition, a Magenta spot disposed substantially to the right may be emulated by adjusting a luminance of the third colored pixels 32, 34 and 36 adjacent on the right of the second pixels 22, 23, and 24 to 40%, 30% and 30%, respectively. Moreover, an appropriately positioned Yellow spot may be emulated by leaving the first colored subpixel 11 (on the right) off while lighting up a desired pair of second and third colored subpixels (where Red plus Green creates a perception of Yellow). Hence a transformation from an RGB triad of primary colors to a Cyan/Magenta/Yellow triad of secondary colors but in a shifted position is made possible by the use of the 3G/2R/1B pixel array structure 100 shown on the right.

Figure 3C:
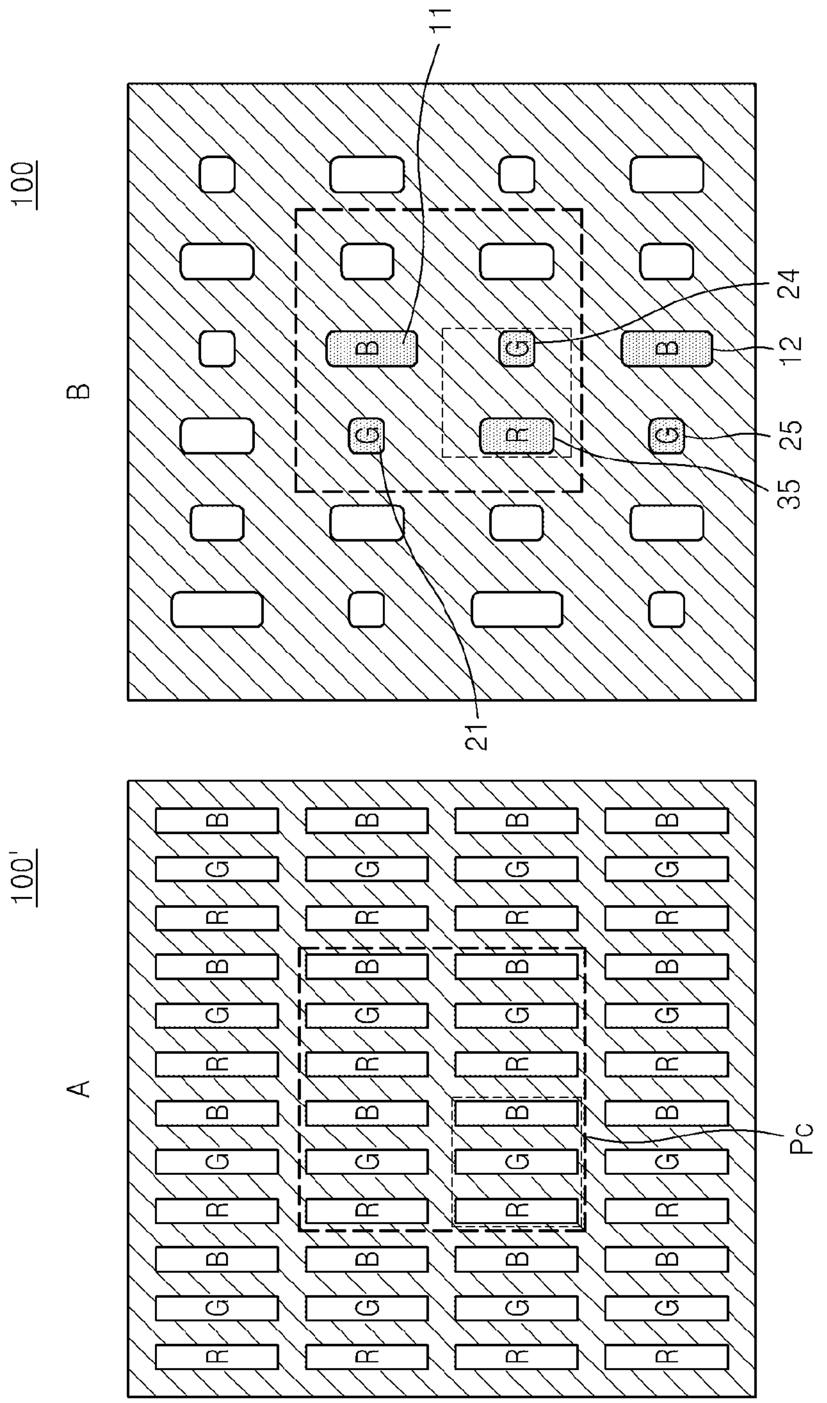

FIG. 3C illustrates an example of a method for implementing a logic pixel of the pixel array structure 100, which corresponds to c-pixel Pc of the stripe-type pixel array structure 100' the highest luminance portion of the c-pixel Pc is located below that of the a-pixel Pa of FIG. 3A. When first pixels 11 and 12 are blue pixels each having its respective luminance set to 50% (of an absolute maximum or of a relative maximum), a Cyan colored spot may be emulated by also driving a second colored subpixel 24 adjacent under the first pixel 11 at a respective luminance value of 80% and further driving second colored subpixels 21 and 25 adjacent on the left of the first pixels 11 and 12 to each have a respective luminance value of 10% (wherein 80%+10%+10%=100%). In addition, a Magenta spot disposed substantially to the bottom may be emulated by instead adjusting a luminance of a third colored subpixel 35 adjacent on the left of the second pixel 24 to 100%. Moreover, an appropriately positioned Yellow spot may be emulated by leaving the first colored subpixels 11 and 12 (on the right portion of FIG. 3C) turned off while lighting up a desired set of second and third colored subpixels (such as 35, 24 and 25; where Red plus Green creates a perception of Yellow). Hence a transformation from an RGB triad of primary colors to a Cyan/Magenta/Yellow triad of secondary colors but in a shifted position is made possible by the use of the 3G/2R/1B pixel array structure 100 shown on the right half of FIG. 3C.

Figure 3D:
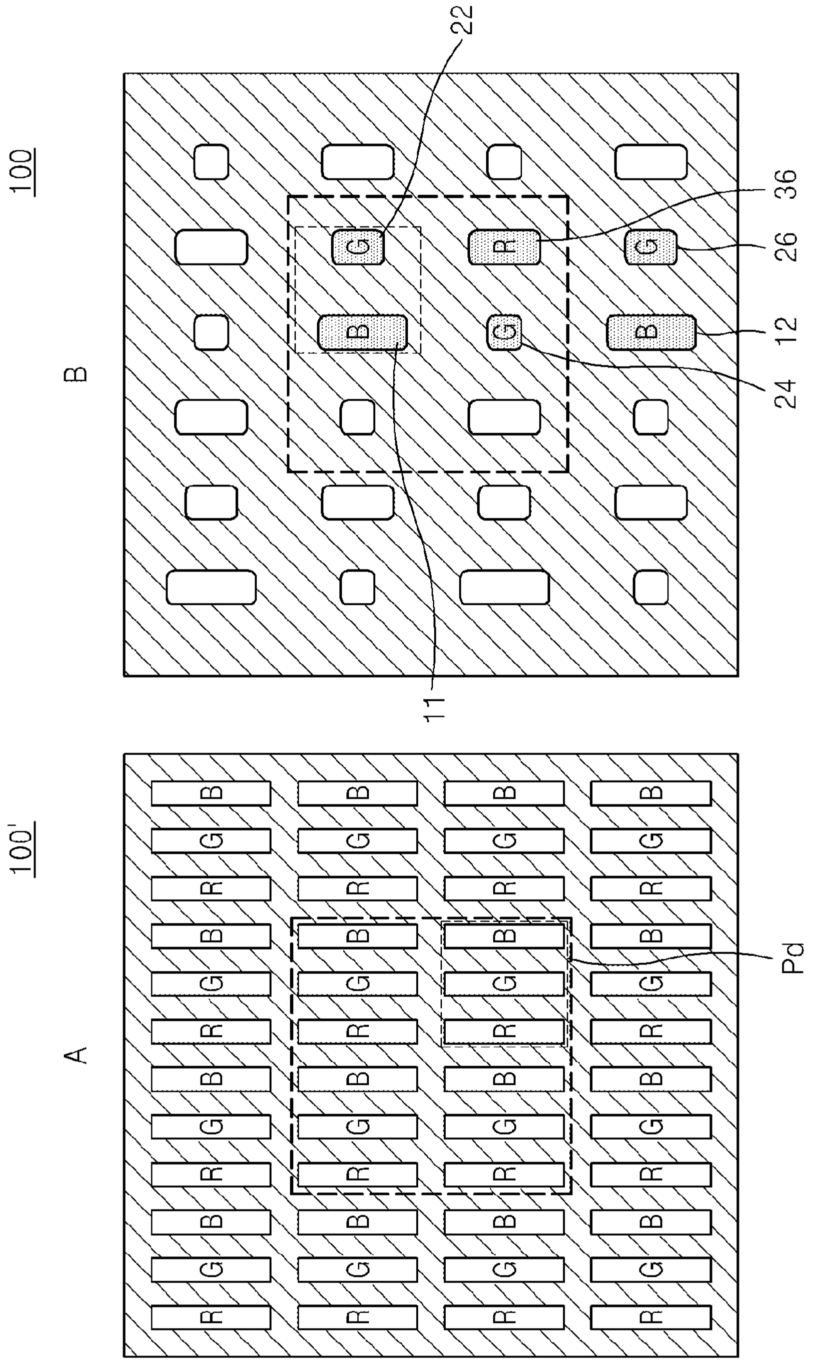

FIG. 3D illustrates an example of a method for implementing a logic pixel of the pixel array structure 100, which corresponds to d-pixel Pd of the stripe-type pixel array structure 100' but this time where its luminance is predominantly disposed in the lower right hand corner. For this case, when first colored subpixels 11 and 12 are blue pixels and are turned on to each have a luminance of 50%, a Cyan colored spot may be emulated by simultaneously driving a second colored subpixel 24 adjacent under the first pixel 11 to have a relative luminance of 80% and driving the second colored subpixels 22 and 26 adjacent on the right of the first pixels 11 and 12 to each have a luminance of 10% (wherein 80%+10%+10%=100%). In addition, a Magenta spot may instead be represented by adjusting a luminance of a third colored subpixel 36 adjacent on the right of the second pixel 24 to 100%.

The rendering driving method is merely exemplary, and may be modified in various ways. In addition, a method for dividing luminance for each pixel or an image processing method may be applied along with the rendering driving method.

When the rendering driving method is used, the pixel array structure 100 may have a smaller number of pixels as compared with the stripe-type pixel array structure 100', and a display apparatus with high resolution of for example greater than 500 ppi without degradation of image quality may be implemented.

The reduction in the total number of the pixels of the pixel array structure 100 may improve the yield and lifespan of the display apparatus including the pixel array structure 100. Since the total number of pixels is reduced, a minimum critical dimension interval (as established by a utilized mass production fabrication process) between the pixels may be secured and process difficulties for the corresponding mass production fabrication process may be overcome. Therefore, as a light-emitting area of the pixel increases at the same luminance, that is, as an aperture ratio increases, a current density flowing through the pixel may be lowered, which may in turn reduce the degradation of the display device.

Figure 4:
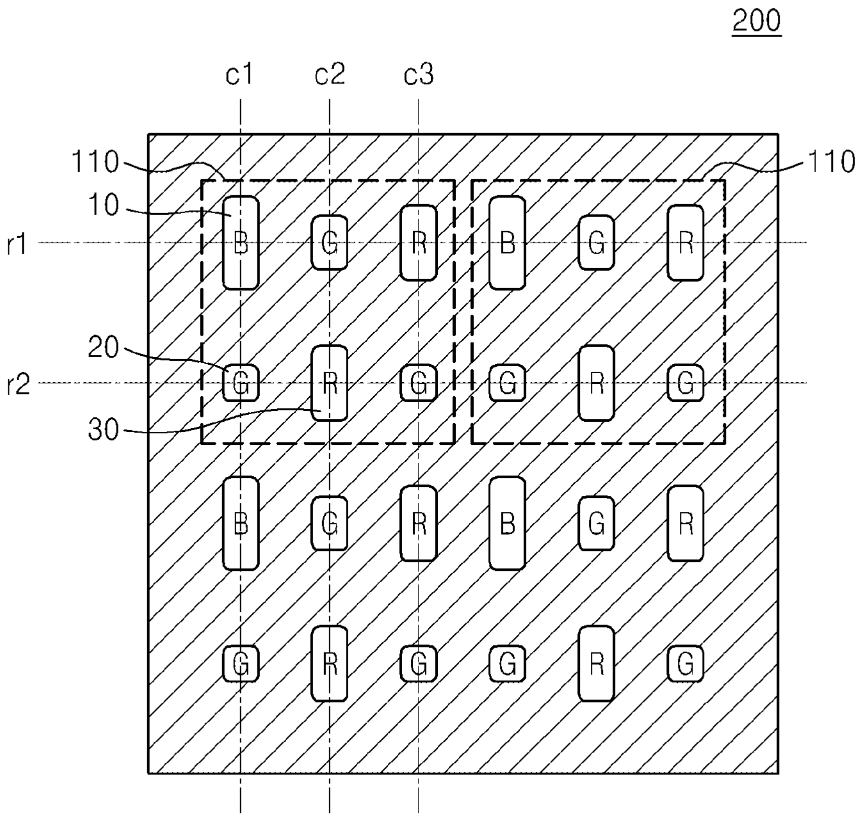
FIG. 4 is a plan view of a 3G/2R/1B pixel array structure according to a second embodiment.

FIG. 4 is a plan view of a pixel array structure 200 according to another embodiment of the present disclosure of invention. In FIG. 4, the same reference numerals as those used in FIG. 1 refer to the same elements, and a redundant description thereof will be omitted.

The pixel array structure 200 of FIG. 4 differs from the pixel array structure 100 of FIG. 1 in that a plurality of first pixel groups 110 are disposed side by side along a plurality of rows and columns. In other words, differently oriented versions of the minimal repeat group such as versions 110 and 120 of FIG. 1 are not used and instead the display area is homogenously populated by just the one repeat version, for example by just version 110.

Referring to the specifics of FIG. 4, the pixel array structure 200 includes a repeat of the first pixel group 110 that includes a first colored subpixel 10 and a second colored subpixel 20 disposed along a first column c1 thereof, another second colored subpixel 20 and a third colored subpixel 30 disposed along a second column c2 thereof adjacent to the first column c1, and a third colored subpixel 30 and yet another second colored subpixel 20 disposed along a third column c3 thereof adjacent to the second column c2. The first pixel groups 110 are repetitively utilized along the rows and columns of the illustrated example.

As such, the pixel array structure 200 may have a smaller number of pixels as compared with the stripe-type pixel array structure 100' and when used in a display apparatus a high resolution of the display apparatus greater than 500 ppi may be achieved without degradation of image quality.

The reduction in the total number of the pixels of the pixel array structure 200 may improve the yield and lifespan of the display apparatus including the pixel array structure 200.

Figure 5:
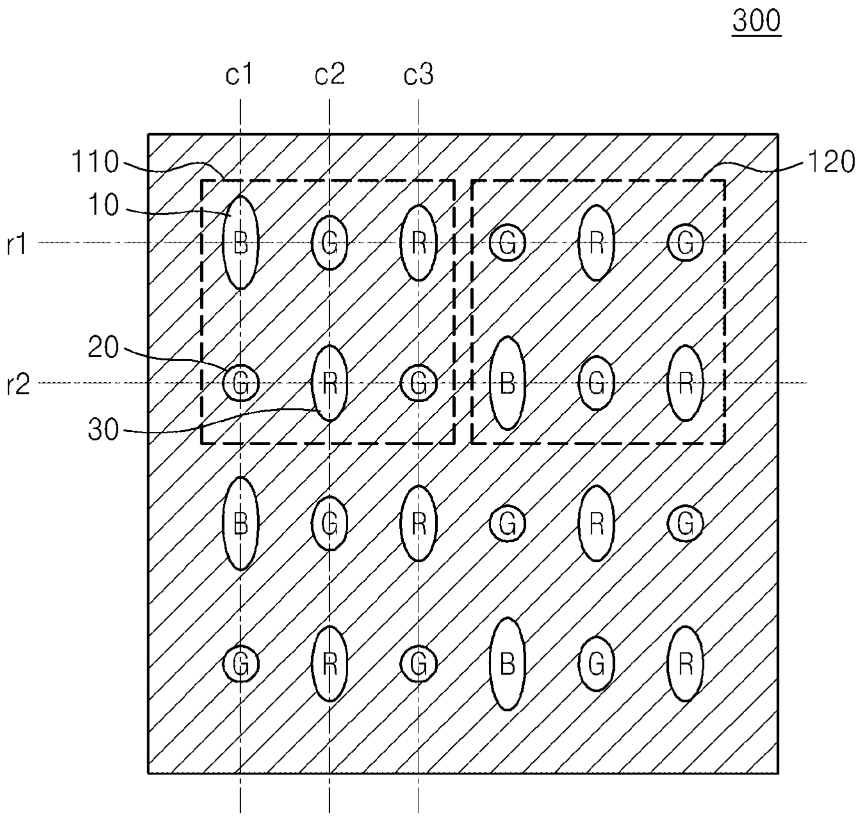
FIG. 5 is a plan view of a pixel array structure according to yet another embodiment.
Figure 6:
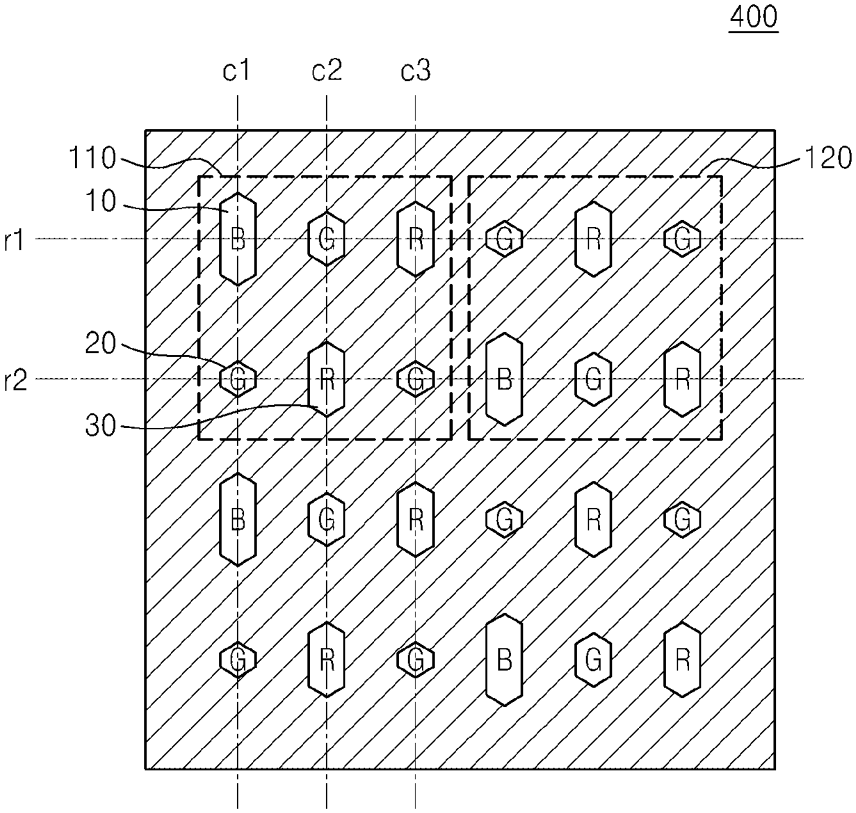
FIG. 6 is a plan view of a pixel array structure according to another embodiment.

FIGS. 5 and 6 are plan views of pixel array structures 300 and 400 according to yet other embodiments in accordance with the present disclosure of invention. In FIGS. 5 and 6, the same reference numerals as those used in FIG. 1 refer to the same elements, and a redundant description thereof will be omitted.

The respective pixel array structures 300 and 400 of FIGS. 5 and 6 differ from the pixel array structure 100 of FIG. 1 in terms of the shapes of the respective first colored subpixel 10, second colored subpixel 20, and third colored subpixel 30.

More specifically, the pixel array structure 300 of FIG. 5 includes the first colored subpixel 10, the second colored subpixel 20, and the third colored subpixel 30 that have a circular or oval shape and represent respective different colors. The pixel array structure 300 includes a first pixel group 110 that includes a first pixel 10 and a second pixel 20 disposed along a first column c1, a second pixel 20 and a third pixel 30 disposed along a second column c2 adjacent to the first column c1, and a third pixel 30 and a second pixel 20 disposed along a third column c3 adjacent to the second column c2.

Therefore, the first pixels 10, the second pixels 20, and the third pixels 30 included in the first pixel group 110 are in a ratio of 1:3:2.

The pixel array structure 400 of FIG. 6 includes a first colored subpixel 10, a second colored subpixel 20, and a third colored subpixel 30 that each have a hexagonal shape (e.g., a regular hexagonal shape for the second colored subpixels 20 and elongated hexagonal shape for the first and third colored subpixels 10 and 30) and respectively represent different colors. The pixel array structure 300 includes a first pixel group 110 that includes a first pixel 10 and a second pixel 20 disposed along a first column c1, a second pixel 20 and a third pixel 30 disposed along a second column c2 adjacent to the first column c1, and a third pixel 30 and a second pixel 20 disposed along a third column c3 adjacent to the second column c2.

Therefore, the first pixels 10, the second pixels 20, and the third pixels 30 included in the first pixel group 110 area in a ratio of 1:3:2.

Figure 7A:
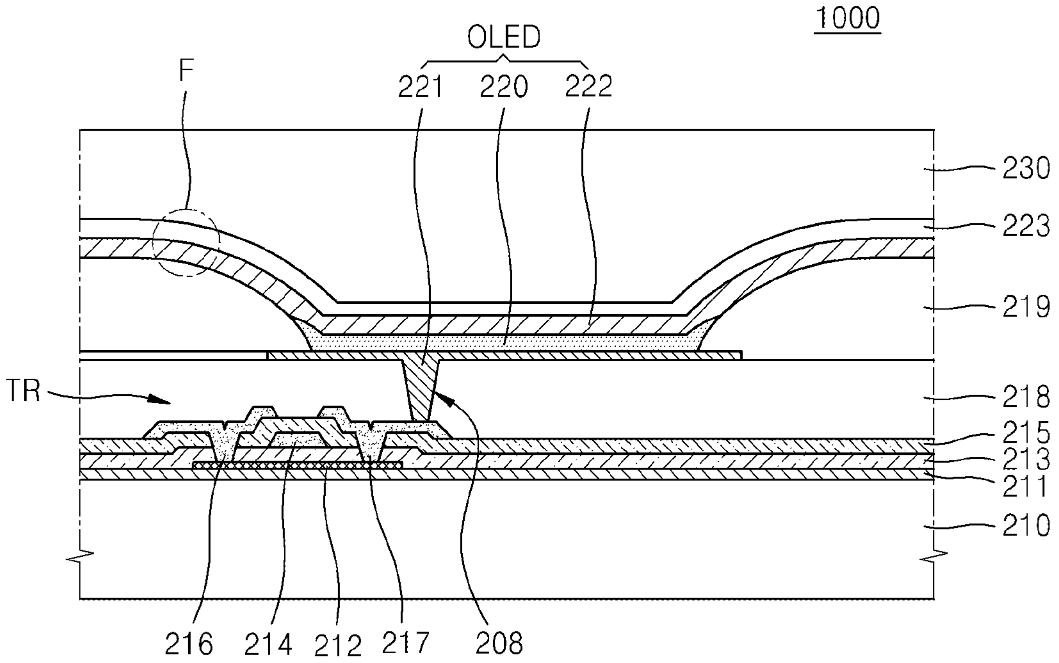
FIG. 7A is a schematic cross-sectional view of a display apparatus including a pixel array structure according to an embodiment of the present disclosure.
Figure 7B:
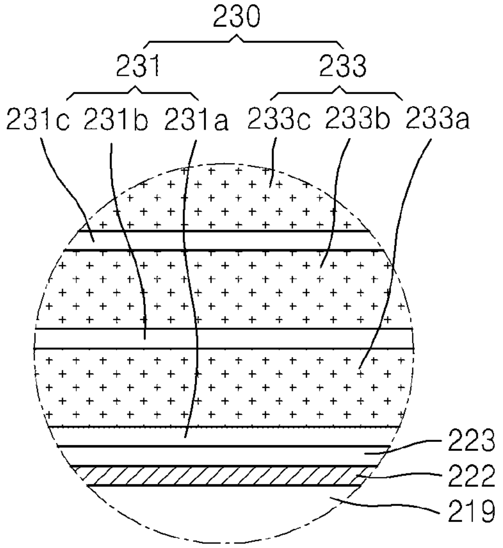
FIG. 7B is an enlarged view of a portion F of FIG. 7A.

FIG. 7A is a schematic cross-sectional view of a display apparatus 1000 employing a pixel array structure according to the present teachings. FIG. 7B is a partial enlarged view of a portion F of FIG. 7A.

Referring to FIG. 7A, the display apparatus 1000 includes a substrate 210 and a plurality of display devices forming a plurality of independently driven pixels or subpixels on the substrate 210. The plurality of pixels may include one of the pixel array structures 100, 200, 300, and 400 according to the embodiments of the present disclosure of invention.

Examples of the display device may include a liquid crystal display (LCD) device, an organic light-emitting device (OLED), a plasma display device, and an electrophoresis device. In addition, the display device may include a thin film transistor.

In some embodiments, the display device may include signal lines, such as a scan line for transferring a gate signal and a data line for transferring a data signal, a switching device connected to the scan line and the data line, and a pixel electrode connected to the switching device and receiving a respective data signal by way of the switching device. Each of the display devices may be constituted by repeated unit pixel cells.

An example in which an organic light-emitting device is used as the display device will be described below with reference to FIG. 7A. However, the teachings of the present disclosure of invention are not limited to that example.

A buffer layer 211 may be formed on the substrate 210. The buffer layer 211 may include an insulating material so as to provide a flat surface on the substrate 21 and prevent penetration of moisture and foreign substances (e.g., oxygen) into the interior of the device 1000.

A thin film transistor TR, a capacitor (not illustrated), and an organic light-emitting device OLED may be formed on the buffer layer 211. The thin film transistor TR may include an active layer 212, a gate electrode 214, and source/drain electrodes 216 and 217. The organic light-emitting device OLED may include a first electrode 221, a second electrode 222, and an intermediate layer 220.

An active layer 212 formed in a predetermined pattern may be disposed on the buffer layer 211. The active layer 212 may include an inorganic semiconductor material such as silicon, an organic semiconductor material, or an oxide semiconductor material, and may be formed by implanting p-type dopants or n-type dopants.

A gate insulating film 213 may be formed on the active layer 212. A gate electrode 214 may be formed on the gate insulating film 213 such that the gate electrode 214 corresponds to the active layer 212.

An interlayer insulating film 215 is formed to cover the gate electrode 214, and source/drain electrodes 216 and 217 are formed on the interlayer insulating film 215. The source/drain electrodes 216 and 217 may be formed to contact respective predetermined regions of the active layer 212.

A planarization film 218 is formed to cover the source/drain electrodes 216 and 217, and a separate insulating film may be further formed on the planarization film 218.

A first electrode 221 may be formed on the planarization film 218. The first electrode 221 may be electrically connected to one of the source/drain electrodes 216 and 217 through a via hole 208.

A pixel definition film 219 may be formed to cover the first electrode 221. An opening is formed in the pixel definition film 219, and an intermediate layer 220 including an organic emission layer may be formed in a region restricted by the opening. The pixel definition film 219 defines a pixel region and a non-pixel region. In other words, the opening of the pixel definition film 219 becomes an actual, light emitting pixel region.

The intermediate layer 220 may further include a hole injection layer (HIL), a hole transport layer (HTL), an electron transport layer (ETL), and an electron injection layer (EIL), as well as the organic emission layer.

A second electrode 222 may be formed on the intermediate layer 220. The first electrode 221 may be patterned at each pixel, and the second electrode 222 may be formed so that a common voltage may be applied to all pixels.

Although only one organic light-emitting device is illustrated in the drawing, the display apparatus 1000 may include a plurality of generally alike organic light-emitting devices except that their light emission spectrums vary in accordance with the above teachings. A single pixel may be formed in each organic light-emitting device OLED, and each pixel may emit one of a red color, a green color, a blue color, or a white color. In the case of Cyan/Magenta/Yellow luminance spots creating methods described above, white subpixels may be added for the purpose of more efficiently producing non-saturated colors.

However, the embodiments of the present disclosure of invention are not limited thereto. The intermediate layer 220 may be commonly formed on an entire planarization film 218, without regard to the position of the pixel. The organic emission layer may be formed by vertically stacking or combining layers including light-emitting materials that emit red light, green light, or blue light. A combination of other colors is also possible as long as selective emission of white light is achieved. In addition, the display apparatus may further include a color filter or a color conversion layer for converting emitted white light into light of a respective predetermined color.

A passivation layer 223 may be disposed on the organic light-emitting device OLED and the pixel definition film 219 in order to cover and protect the organic light-emitting device OLED. The passivation layer 223 may include an inorganic insulating film and/or an organic insulating film.

An encapsulating film 230 includes an inorganic film 231 and an organic film 233. The inorganic film 231 may include a plurality of inorganic films 231*a*, 231*b* and 231*c*, and the organic film 233 may include a plurality of organic films 233*a*, 233*b* and 233*c*. Although the inorganic film 231 and the organic film 233 are alternately stacked as illustrated in the drawing, the embodiments of the present invention are not limited thereto.

As described above, according to the one or more of the above embodiments of the present disclosure of invention, the number of pixels in the pixel array structure be reduced to other than a 1:1:1 ratio in terms of numbers of subpixels of each of the colors and the display apparatus including the pixel array structure may have ultra-high resolution greater than 500 ppi without degradation of the perceived image quality.

Moreover, according to the one or more of the above embodiments of the present disclosure of invention, the display apparatus employing the pixel array structure may improve the life and yield of products while ensuring the high aperture ratio.

It should be understood that the exemplary embodiments described herein should be considered in a descriptive sense only and not for purposes of limitation. Descriptions of features or aspects within each embodiment should typically be considered as available for other similar features or aspects in other embodiments.

While one or more embodiments of the present disclosure of invention have been described with reference to the figures, it will be understood by those of ordinary skill in the art and in light of the present disclosure that various changes in form and details may be made therein without departing from the spirit and scope of the present teachings.

What is claimed is:

1. A display device having a display area populated by a repeat group of minimal size among repeat groups in a tessellating manner, the repeat group comprising:

a first number of first colored subpixels configured to transmit light having a first wavelength range, the first number being one or more;

a second number of second colored subpixels configured to transmit light having a second wavelength range, the second number being three or more;

a third number of third colored subpixels configured to transmit light having a third wavelength range, the third number being two or more;

wherein the third number is greater than the first number and less than the second number;

wherein the second wavelength range is interposed on the visible light spectrum between the first wavelength range and the third wavelength range.

2. The display device of claim 1, wherein:

said first, second and third numbers are respectively in a ratio of 1:3:2.

3. The display device of claim 1, wherein:

the repeat group has plural rows and plural columns;

the second number of the second colored subpixels of the repeat group are disposed in more than one column or row thereof; and the third number of the third colored subpixels of the repeat group are disposed in more than one column or row thereof.

4. The display device of claim 3, wherein:

a first colored subpixel of the repeat group is disposed in a first column thereof and is further disposed in a same row of the repeat group as are a second colored subpixel thereof and a third colored subpixel thereof.

5. The display device of claim 3, wherein:

a second colored subpixel of the repeat group is disposed in a first column thereof and is further disposed in a same row of the repeat group as are a third colored subpixel thereof and another second colored subpixel thereof.

6. The display device of claim 1, wherein:

the first colored subpixel is a blue subpixel.

7. The display device of claim 6, wherein:

the second colored subpixel is a green subpixel and the third colored subpixel is a red subpixel.

8. The display device of claim 1, wherein:

at least one of the second colored subpixels is larger in area than one or more of the other second colored subpixels of the same repeat group.

9. The display device of claim 1, wherein:

at least one of the second colored subpixels is smaller in area than a corresponding area of at least one of the first colored subpixels and the third colored subpixels of the same repeat group.

10. The display device of claim 1, wherein:

a same version of the repeat group is replicated in side by side manner to thereby define at least one of plural rows or at least one of plural columns of the display area.

11. The display device of claim 1, wherein:

the display area is populated by tessellation of minimal size repeat groups in which a first repeat group differs in orientation from a second repeat group.

12. The display device of claim 11, wherein:

the first repeat group is vertically or horizontally flipped in orientation relative to that of the second repeat group.

13. The display device of claim 1 and further comprising a subpixel rendering (SPR) unit configured to perform subpixel rendering by varying the luminance levels of the first, second, and third colored pixels.

14. The display device of claim 13 wherein the first, second, and third colored subpixels are blue, green, and red subpixels, and the SPR unit performs subpixel rendering by varying the luminance levels of the blue, green, and red subpixels to achieve colors into a Cyan/Magenta/Yellow coordinate space.

15. The display device of claim 1 wherein:

at least one of the first colored subpixels, the second colored subpixels, and the third colored subpixels has a rounded corners rectangular shape.

16. The display device of claim 1 wherein:

at least one of the first colored subpixels, the second colored subpixels, and the third colored subpixels has a circular, oval, or polygonal shape.

17. A display apparatus comprising:

a substrate; and a plurality of display elements disposed on the substrate and defining a plurality of differently colored subpixels distributed within a display area of the substrate, the differently colored subpixels including:

one or more first colored subpixels each configured to transmit a same, first colored light, three or more second colored subpixels each configured to transmit a same, second colored light, and two or more third colored subpixels each configured to transmit a same, third colored light, wherein the distribution of the subpixels within the display area is defined by a pixel array structure that includes one or more first pixel groups, each of the first pixel groups including:

a first colored subpixel and a second colored subpixel disposed along a first column;

another second colored subpixel and a third colored subpixel disposed along a second column adjacent to the first column; and another third colored subpixel and yet another second colored subpixel disposed along a third column adjacent to the second column, wherein respective populations of the first colored subpixels, the second colored subpixels, and the third colored subpixels as included in the first pixel group are in a respective ratio of 1:3:2.

18. The display apparatus of claim 17, wherein the first colored subpixel is a blue pixel.

19. The display apparatus of claim 17, wherein a plurality of first pixel groups are disposed side by side to thereby defined corresponding rows and columns of the display area.

20. The display apparatus of claim 17, wherein the pixel array structure further includes a second pixel group that is a vertically or horizontally flipped version of the first pixel group, wherein the first and second pixel groups are alternately disposed along at least one of same row and same columns of repeat groups forming the pixel array structure of the display area, wherein the vertically flipped version refers to a pixel group in which its subpixel row positions are inverted compared to the first pixel group, and wherein the horizontally flipped version refers to a pixel group in which its subpixel column positions are inverted compared to the first pixel group.

* * * * *